United States Patent [19]

Carr

[11] Patent Number: 4,481,755
[45] Date of Patent: Nov. 13, 1984

[54] GANG MOWER TRAILER

[75] Inventor: Jack Carr, Glenview, Ill.

[73] Assignee: Roseman Mower Corporation, Glenview, Ill.

[21] Appl. No.: 502,643

[22] Filed: Jun. 9, 1983

[51] Int. Cl.³ ..................... A01D 35/12; A01D 75/30
[52] U.S. Cl. .......................................... 56/7; 56/16.2
[58] Field of Search ....................... 56/6, 7, 15.8, 16.2, 56/13.6

[56] References Cited

U.S. PATENT DOCUMENTS

| | | | |
|---|---|---|---|
| 1,957,079 | 5/1934 | Ronning | 56/7 |
| 2,672,000 | 3/1954 | Speiser | 56/7 |
| 3,049,851 | 8/1962 | Hargreanes et al. | 56/7 |
| 3,612,573 | 10/1971 | Hoffman | 56/7 |
| 3,832,835 | 9/1974 | Hall et al. | 56/7 |
| 4,370,846 | 2/1983 | Arnold | 56/6 |

FOREIGN PATENT DOCUMENTS

| | | | |
|---|---|---|---|
| 278993 | 5/1966 | Australia | 56/7 |
| 1542661 | 3/1979 | United Kingdom | 56/7 |

Primary Examiner—Paul J. Hirsch
Attorney, Agent, or Firm—Kinzer, Plyer, Dorn & McEachran

[57] ABSTRACT

A hydraulically operated gang mower trailer which is connectable to a tractor having a source of pressurized hydraulic fluid for actuating cylinders to raise and lower the mowers. The trailer has a tow bar assembly which permits connection to tractors at varying vertical heights. The trailer has a frame and reel mounting which minimizes the weight carried by the tractor. A stacked set of lever operated hydraulic spool valves which control the flow of pressurized hydraulic fluid to the hydraulic cylinders for lifting and lowering the mowers can be easily moved from tractor to the trailer by disconnecting a minimum number of hydraulic hoses.

3 Claims, 3 Drawing Figures

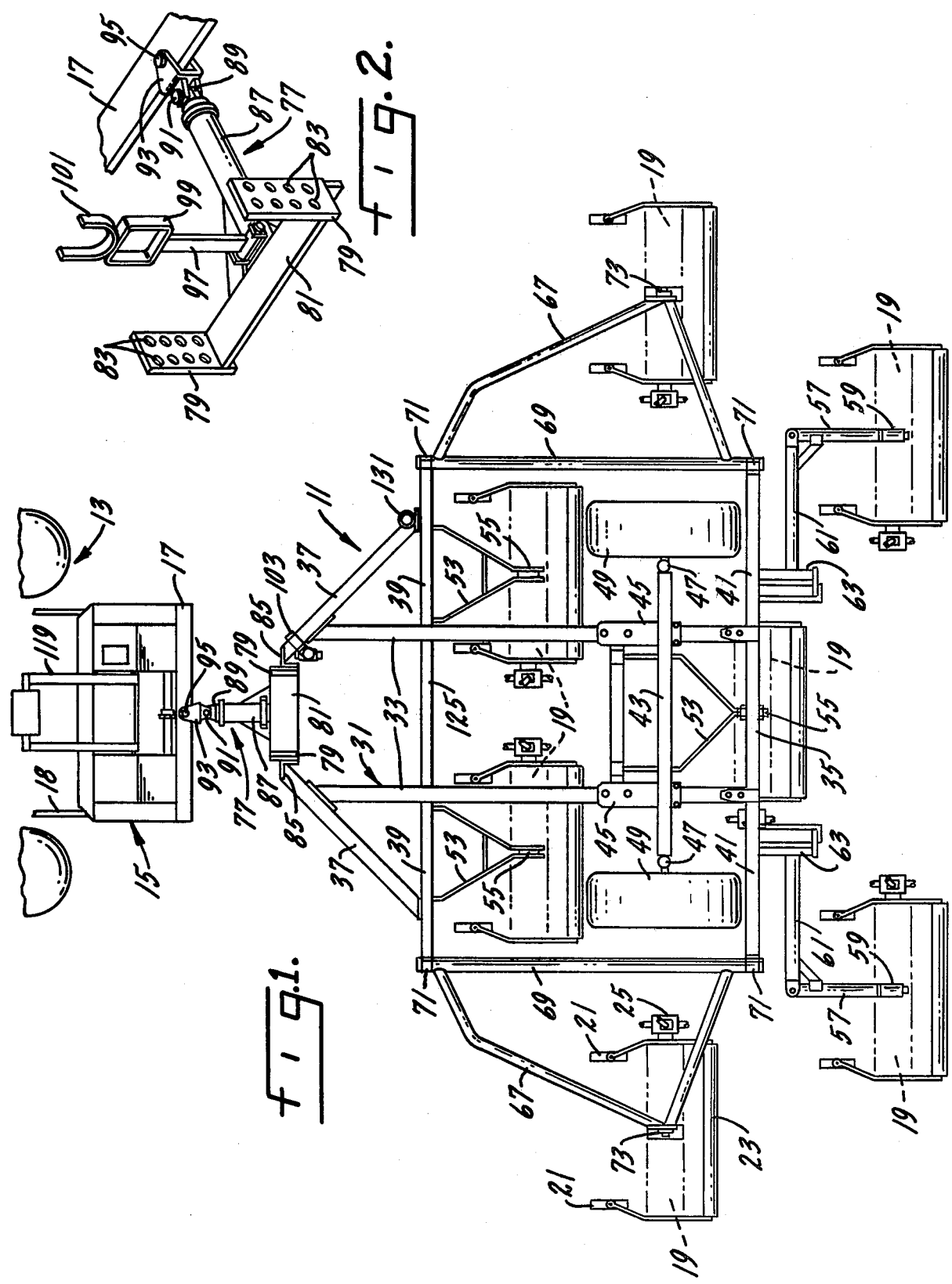

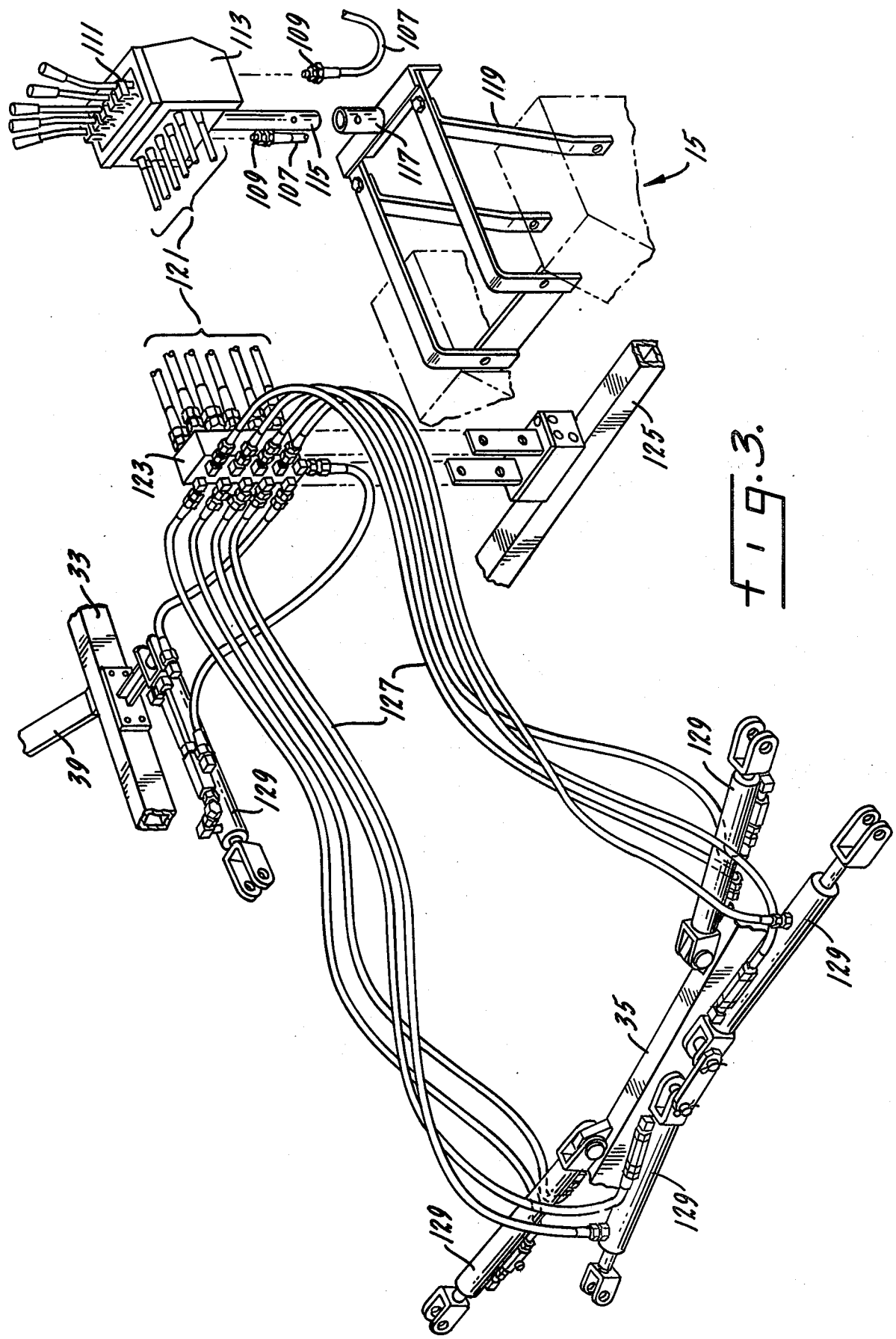

GANG MOWER TRAILER

BACKGROUND AND SUMMARY OF THE INVENTION

Our U.S. Pat. No. 3,832,835 shows a packaged hydraulically operated gang mower assembly for mounting on an industrial or farm type tractor to provide a highly efficient lawn mowing apparatus having hydraulically driven reel mowers which operated at high speeds and yet is highly maneuverable. This assembly has been very successful and although it is relatively easily attached to and removed from an industrial or farm type tractor, the installation and removal of this apparatus does take time and thus prevents immediate use of the tractor for non-grass mowing purposes. Because of the time involved, installation and removal from an industrial or farm type tractor is not practical for short periods of use of the tractor for other than grass mowing purposes.

Thus, an object of this invention is a packaged hydraulically operated gang mower assembly mounted on a trailer which can be attached to and operated by an industrial or farm type tractor.

Another object of this invention is a trailer having a hydraulic system for raising and lowering gang mowers which hydraulic system can be easily connected to and disconnected from a source of hydraulic fluid under pressure supplied by the tractor.

Another object of this invention is a stacked spool valve control for the hydraulic cylinders which raise and lower the gang mowers which spool valve control can be moved from the tractor to a storage position on the trailer without disconnecting all of the hydraulic fluid lines which extend between the spool valve control and the hydraulic cylinders.

Another object of the invention is an adjustable connection between the trailer and the tractor which permits connection of the trailer and the tractor in spite of vertical misalignment of the two.

Another object of the invention is a trailer carrying hydraulic driven reel mowers which are designed to apply minimum weight to the tractor towing attachment.

Another object of the invention is a connection between the trailer and the tractor which permits the tractor to turn 90° relative to the trailer.

Other objects may be found in the following specification, claims and drawings.

BRIEF DESCRIPTION OF THE DRAWINGS

FIG. 1 is a top plan view of the hydraulically operated gang mower trailer of this invention connected to a tractor having a source of pressurized hydraulic fluid with parts broken away, other parts omitted for clarity and parts of the reel mowers shown in phantom line;

FIG. 2 is an enlarged perspective partial view of the adjustable tow bar assembly of this invention; and FIG. 3 is a partial exploded perspective view of the hydraulic control system for raising and lowering the hydraulic driven mowers with some parts broken away, some parts omitted and others shown in phantom lines.

DESCRIPTION OF THE PREFERRED EMBODIMENT

FIG. 1 is a top plan view of a seven gang mower unit carried on a trailer 11 pulled by an industrial or farm type tractor 13. A hydraulic pump and reservoir unit 15 is mounted on a frame 17 which is attached to the three point hitch 18 of the tractor. The trailer 11 is intended for supporting reel mowers 19 which are hydraulically driven and are of the type having front caster wheels 21 and a rear roller 23. Each reel mower is driven by an independent hydraulic motor 25.

The trailer 11 includes a U-shaped frame 31 with its open end extending in the forward direction of the trailer. The frame has longitudinally extending side members 33 joined by an end cross member 35 at its rear. Rearwardly and outwardly diagonally extending beams 37 are connected intermediate their ends to the forward ends of the longitudinally extending side members 33. Front cantilever beams 39 extend upwardly and laterally outwardly from the longitudinal side members 33 and are fastened to the rearward ends of the diagonal members 37. Rear cantilevered beams 41 extend upwardly and laterally outwardly from the longitudinally extending side members 33 in alignment with the end cross member 35. A wheel support beam 43 is mounted on plates 45 which are supported on the longitudinally extending side members 33 of the frame. The beam extends beyond the side members 33 and spindles 47 which are attached to opposite ends of the wheel support beam have wheels 49 rotatably mounted thereon.

Three of the mowers 19 are fastened to the frame 31 generally inside the dimensions of the frame with each attached by an arm 53 which is pivotally mounted to the frame for up and down movement. Each arm is connected to a mower by a ball connector 55. The two mowers 19 which are carried behind the trailer are each connected to a mower arm 57 by a ball joint 59. Each mower arm 57 is pivotally connected at its inner end to an arm 61 extending at right angles thereto which arm in turn is pivotally mounted to the frame 31 for rotation about a horizontal axis at 63.

The side mowers 19 are connected to the outer ends of irregularly shaped side mower arms 67 which arms are fastened to tubes 69 mounted in sleeves 71. Sleeves 71 are supported at the ends of the front and rear cantilever beams 39 and 41, respectively. The mowers are connected to the side mower arms 67 by ball connectors 73. The ball connectors 73 generally align with the wheel support beam 43 and the wheel spindles 47 to provide stability for the trailer during lifting and lowering of the mowers mounted on the arms 67. The positioning of the mowers relative to the frame 31 applies most of the weight to the support beam 43 and thus to the wheels 49 and not to the trailer 13.

The hydraulic system for raising and lowering the mowers 19 is shown in detail in FIG. 3 and will be described hereinafter. For clarity of illustration, many of the details of the mower lifting system have been omitted from these drawings but the system is similar to that shown and described in U.S. Pat. No. 3,832,835 assigned to the same assignee as this specification.

The trailer 11 may be connected to the frame 17 of the hydraulic pump and reservoir unit 15 which is mounted on the tractor 13 by a tow bar assembly 77 shown in enlarged detail in FIG. 2 of the drawings. The tow bar assembly includes a pair of upstanding plates 79 which are located at opposite ends of a cross plate 81. Two rows of openings 83 are formed in each of the plates 79. The openings are sized to receive bolts (not shown) which also fit in openings (not shown) in angles 85 attached to the forward ends of the diagonal members 37 of the frame 31. The rows of openings permit vertical adjustable attachment of the tow bar assembly relative to the trailer 11.

A tube 87 extends in a forwardly direction from the cross plate 81 and is fastened thereto. The eye 89 of a spring loaded bolt extends out of the tube 87 and is fastened by a pivot pin 91 to a bracket 93 which is in turn fastened by a pivot pin 95 to the frame 17. The spring loaded bolt which moves in and out of the tube 87 permits the tractor to make a turn of 90° relative to the trailer without permitting the tractor to strike the trailer.

A hose support 97 is pivotally mounted in an upstanding position on the tube 87. The hose support includes a rectangularly shaped opening 99 for receiving the hydraulic mower hoses (not shown) and a stirrup portion 101 for supporting the hydraulic cylinder hoses shown in FIG. 3. A trailer parking wheel 103 which can be raised and lowered is mounted on one of the rearwardly extending diagonal members 37 of the trailer frame.

FIG. 3 of the drawings shows the hydraulic system for operating the hydraulic cylinders which raise and lower the hydraulic driven mowers 19 carried on the trailer 11. The pressurized hydraulic fluid for operating the hydraulic cylinders is provided from the hydraulic system of the tractor 13 by means of hydraulic hoses 107 having quick connect and disconnect fittings 109. The hoses 107 connect to lever operated ganged spool valves 111 which are mounted in a housing 113. The housing is supported on a tubular post 115. The tubular post 115 telescopes inside a tubular socket 117 which is supported on a frame 119. The frame 119 is mounted on the hydraulic pump and reservoir unit 15. A removable locking pin (not shown) extends through alignable openings in the tubular post 115 and tubular sockets 117 to secure the spool valve housing 113 in proper position.

Hydraulic hoses 121 extend from the spool valves 111 to a support block 123 mounted on a cross beam 125 of the trailer frame 31. Hydraulic hoses 127 lead from the support block 123 to the individual hydraulic cylinders 129 which are pivotally mounted on the longitudinally extending side members 33 and end cross member 35 of the trailer frame 31. Since there are five hydraulic cylinders 129, there are five lever operated spool valves 111 and ten sets of hydraulic hoses 121 and 127 with a set of hoses leading to each hydraulic cylinder.

When the trailer 11 is to be disconnected from the tractor 13, it is only necessary to disconnect the two hydraulic lines 107 leading from the tractor hydraulic power supply to the housing 113 containing the handle lever operated spool valves 111. Since the hydraulic fluid lines 107 from the tractor have quick disconnect fittings 109, this is easily accomplished. The pin holding the tubular post 115 in place in the tubular socket 117 is removed and the housing 113 is lifted from the socket 117 carrying its hydraulic hoses 121 along with it. A tubular socket 131 identical to the tubular socket 117 is provided on the frame 31 of the trailer 11 to receive the tubular post 115 and thereby support the housing 131, spool valves 111 and hoses 121 on the trailer 11. Thus, the hydraulics applied to the hydraulic cylinders 129 can be disconnected and connected simply by disconnecting or connecting two hoses 107 rather than the ten hydraulic hoses 121 which normally would have to be manipulated.

I claim:

1. A hydraulically operated gang mower trailer connectable to a tractor having a source of pressurized hydraulic fluid, including:
   a generally U-shaped frame having its open portion located at the front of the trailer,
   a tow bar assembly having means at one end for connection to the U-shaped frame at the open portion thereof and means at the opposite end thereof for connection to a tractor,
   the tow bar assembly frame connection means permitting attachment to the U-shaped frame at different positions of vertical adjustment to vary the vertical location of its means for connection to a tractor,
   a wheel axle support beam carried on the U-shaped frame near the rear thereof,
   a wheel spindle affixed to each opposite end of the axle support beam outwardly of the U-shaped frame, and
   a first pair of laterally spaced mower arms attached to the frame, one on each side of the frame, with the mower arms located to position the mowers supported by the arms in transverse alignment with the wheel axle support beam.

2. The hydraulically operated gang mower trailer of claim 1 in which the tow bar assembly frame connection means includes a pair of spaced upstanding plates, each plate fastened to an opposite end of a cross plate and at least one vertically extending row of fastener receiving openings formed in each upstanding plate, the openings being alignable with openings in the frame to receive fasteners to attach the tow bar assembly to the frame.

3. The hydraulically operated gang mower trailer of claim 1 in which an upstanding hydraulic hose support is attached to the tow bar assembly.

* * * * *